Figure 1:
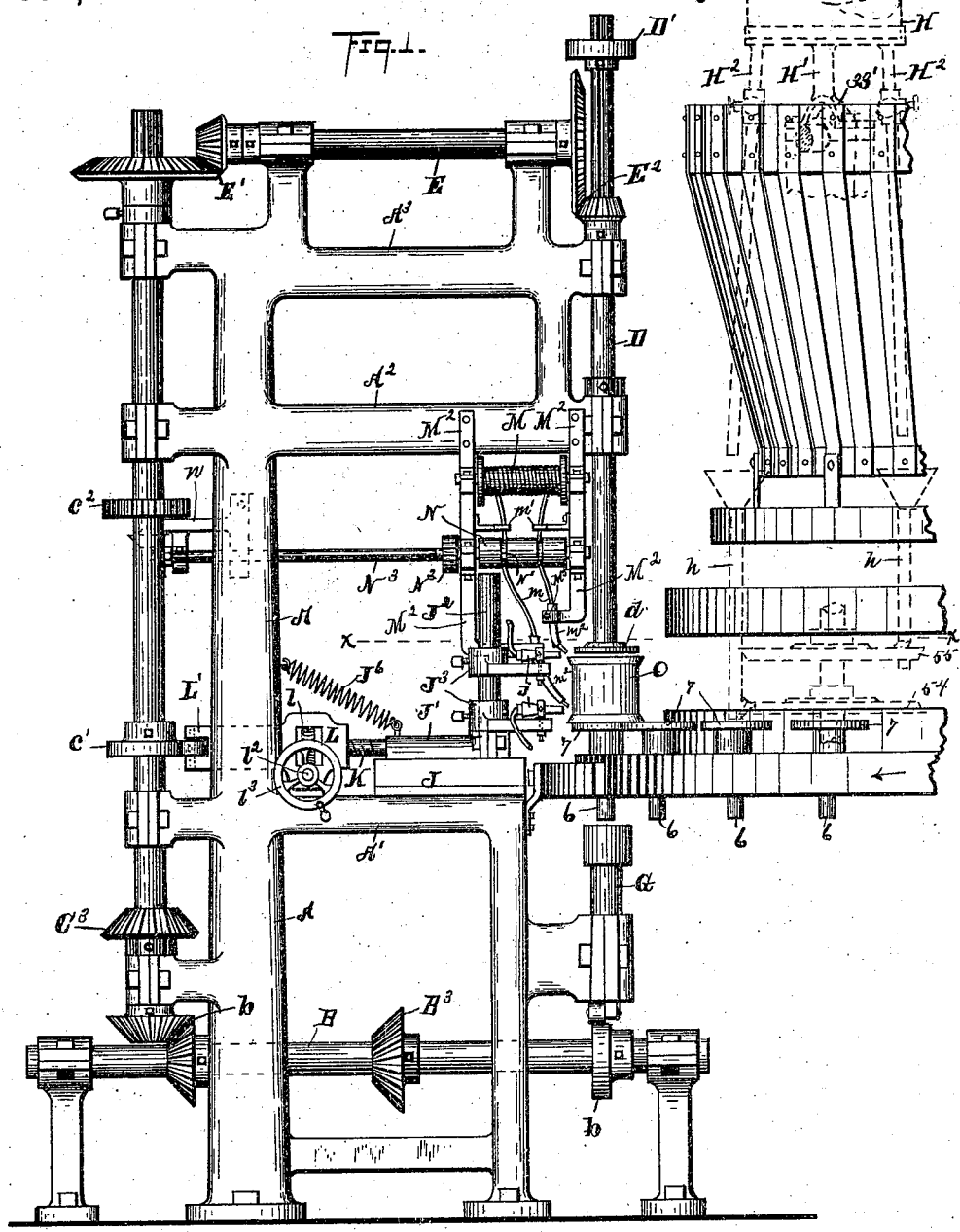

(No Model.) 5 Sheets—Sheet 1.

J. W. ROBERTS.
SOLDERING MACHINE.

No. 502,141. Patented July 25, 1893.

WITNESSES
Bell S. Lowrie
A. S. Lowrie

INVENTOR
John W. Roberts
By Geo. W. King. ATTORNEY (No Model.) 5 Sheets—Sheet 2.
J. W. ROBERTS.
SOLDERING MACHINE.
No. 502,141. Patented July 25, 1893.
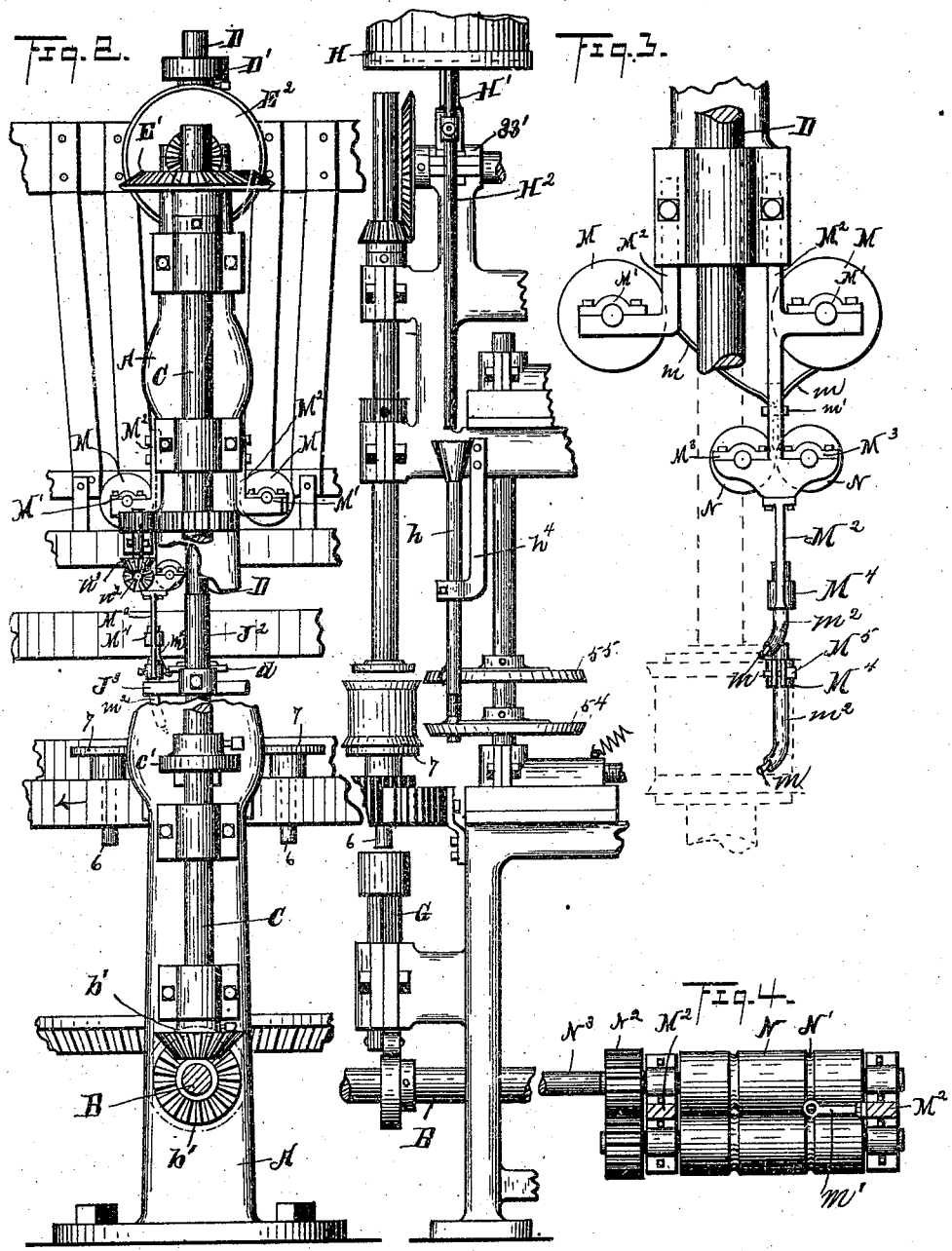
WITNESSES
Belle S. Lowrie
A. S. Lowrie
INVENTOR
John W. Roberts.
By Geo. W. King.
ATTORNEY

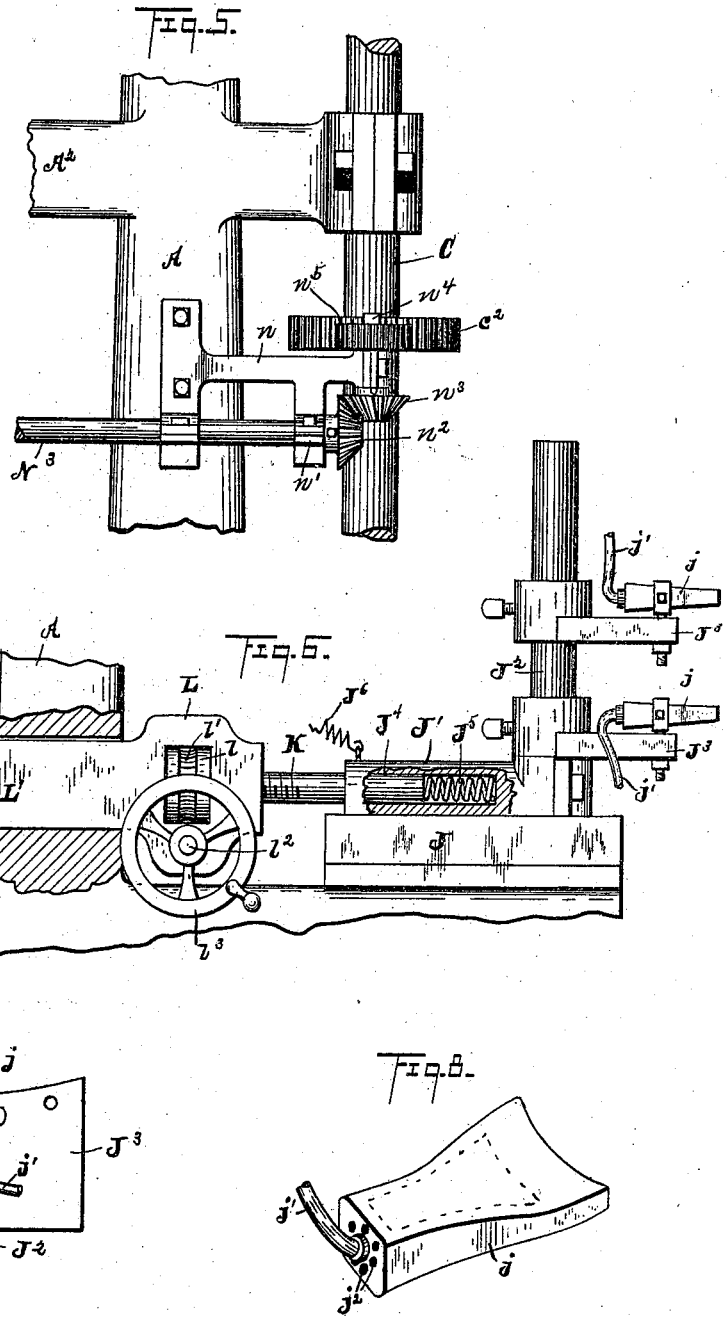

(No Model.) 5 Sheets—Sheet 4.
J. W. ROBERTS.
SOLDERING MACHINE.
No. 502,141. Patented July 25, 1893.
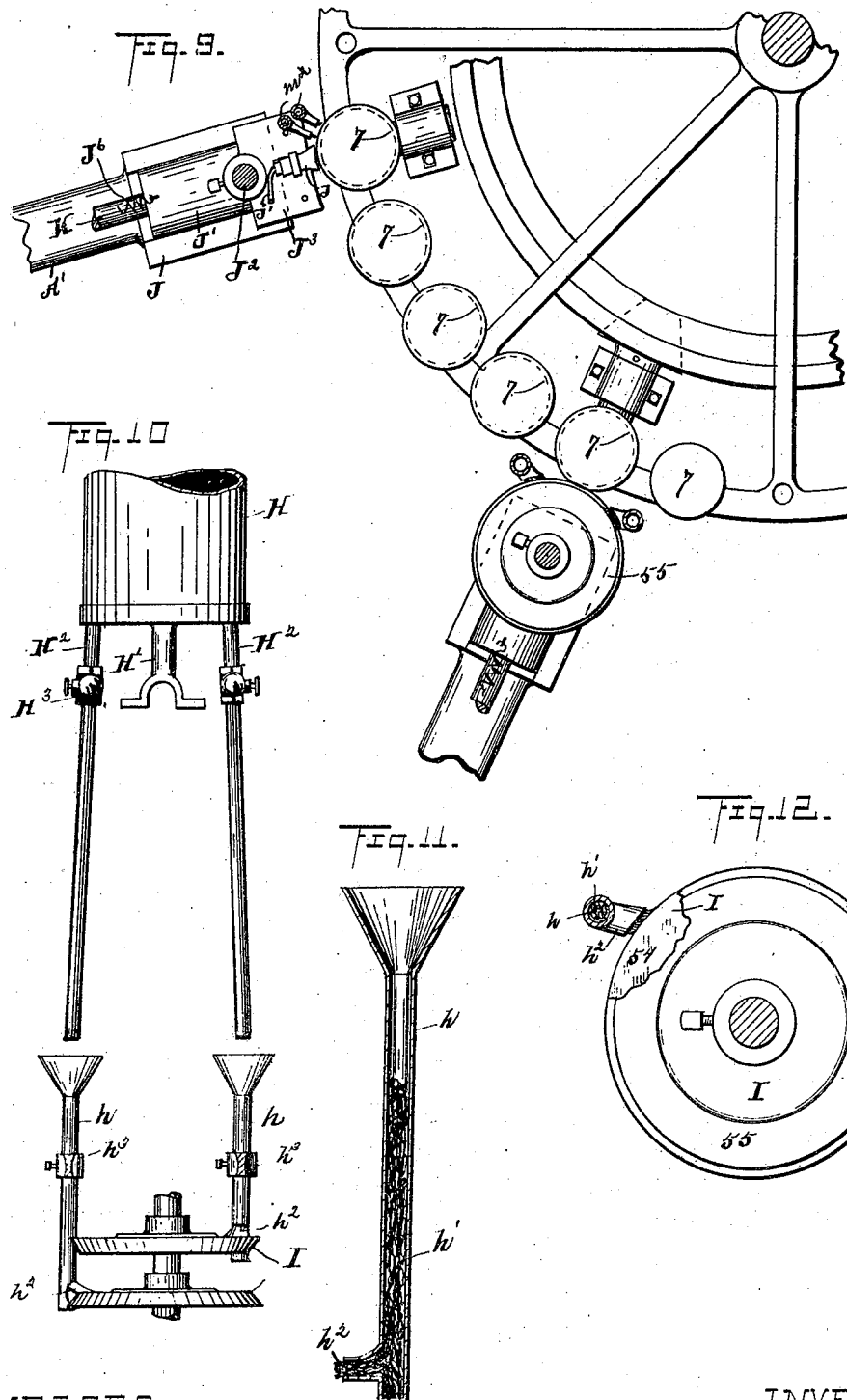
WITNESSES.
Belle S. Lowrie
A. S. Lowrie
INVENTOR.
John W. Roberts
By Geo. W. King. ATTORNEY.

(No Model.)  
5 Sheets—Sheet 5.
J. W. ROBERTS.
SOLDERING MACHINE.
No. 502,141. Patented July 25, 1893.
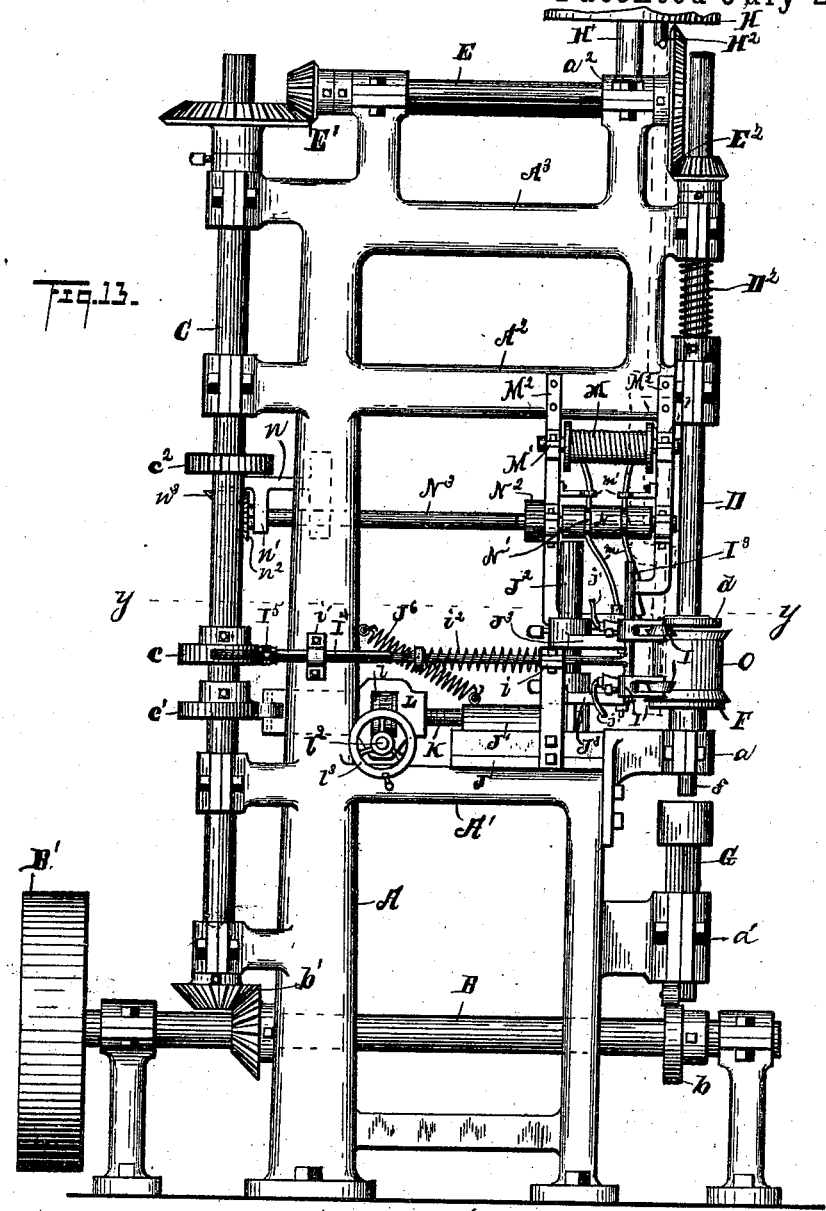
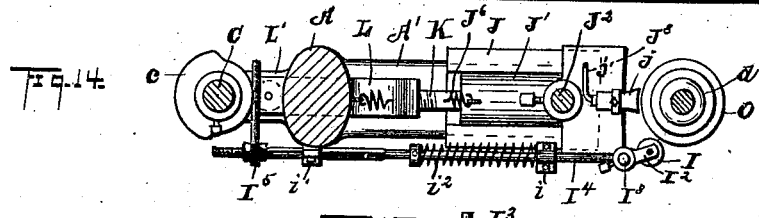
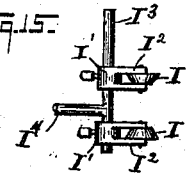
WITNESSES.
Belle S. Lowrie
A. S. Lowrie
INVENTOR.
John W. Roberts
By Geo. W. King. ATTORNEY

UNITED STATES PATENT OFFICE.

JOHN W. ROBERTS, OF CLEVELAND, OHIO, ASSIGNOR, BY DIRECT AND MESNE ASSIGNMENTS, TO THE SHERWIN-WILLIAMS COMPANY AND THE ROBERTS TIN WARE COMPANY, OF SAME PLACE.

SOLDERING-MACHINE.

SPECIFICATION forming part of Letters Patent No. 502,141, dated July 25, 1893.

Application filed October 18, 1892. Serial No. 449,300. (No model.)

*To all whom it may concern:*

Be it known that I, JOHN W. ROBERTS, of Cleveland, in the county of Cuyahoga and State of Ohio, have invented certain new and useful Improvements in Soldering-Machines; and I do hereby declare the following to be a full, clear, and exact description of the invention, such as will enable others skilled in the art to which it pertains to make and use the same.

My invention relates to improvements in machines for soldering cans and analogous work. Such machine may be used and is designed more especially as an adjunct to a crimping machine for which United States Letters Patent No. 476,558 were granted to me June 7, 1892, and to which patent reference is hereby made. When so used the can or other work is soldered before it is discharged from the crimping machine. In other words, the crimping machine feeds the cans to and discharges the soldered cans from the soldering machine, so that the cans after they have been placed in the crimping machine require no further handling or attention until they are crimped, soldered and discharged. But the crimping machine is somewhat expensive. Consequently some of the smaller factories might not feel warranted in purchasing the same, or, they might have other means of crimping the cans, and to meet such cases, I construct some of my soldering machines so that they may be operated as independent machines; in which case, the cans, by hand, are fed to and removed from the soldering machine. Also in the one case, the crimping disks of the crimping machine are utilized in applying the flux to the can, while in the other case, small disks are provided especially for this purpose.

Some other minor members of the crimping machine are made to serve a double purpose when the two machines are combined, and their places have to be supplied in the soldering machine when the latter is used alone; all of which will hereinafter more fully appear.

In the accompanying drawings both constructions are shown, but in the main they are substantially alike.

Figure 1 is a side elevation of my improved soldering machine, portions of the aforesaid crimping machine being also shown at the right hand. Fig. 2 is an end elevation of the soldering machine, showing also in the background and to the right hand, portions of the crimping machine. Fig. 3 is an enlarged elevation in detail of the spools bearing the soldering wires and of the feed rolls, and Fig. 4 is a plan of these feed rolls. Fig. 5 is an enlarged elevation in detail of the driving mechanism of the feed rolls, showing the reverse side of column A. Fig. 6 is an enlarged side elevation of the soldering tools and actuating mechanism thereof. Fig. 7 is a plan of a soldering tool and its supporting plate. Fig. 8 is an enlarged perspective view of a soldering tool. Fig. 9 is a horizontal section taken on line $x\,x$ Fig. 1. Fig. 10 is an enlarged side elevation of the flux container and feed tubes, and Figs. 11 and 12 are still further enlarged, the former being an elevation partly in section of one of the feed tubes, and the latter being a plan showing the eduction ends of the feed tubes as applied to the disks, a portion of the upper disk being broken away. Fig. 13 is a side elevation of the soldering machine as constructed to operate as an independent machine. Fig. 14 is a horizontal section taken on line $y\,y$, Fig. 13. Fig. 15 is an elevation in detail of the disks for applying the flux to the work, together with the supports for the same.

I will first describe the independent machine shown more clearly as a whole in Fig. 13. A suitable supporting frame is provided such for instance as shown, such frame comprising in the main a supporting column A, provided with various arms A', A², &c., suitable for sustaining the different members of the machine. This frame is provided with suitable boxes in which are journaled the respective shafts B, C, D, and E; the former being the driving shaft. Shaft B is provided with a driving pulley B' and with a cam $b$, and this shaft is intergeared with the upright shaft C by means of miter gears as at $b'$ whereby shafts B and C revolve in unison. Shaft C, at or near the upper end thereof is intergeared with shaft E by means of bevel gears as at E' and shaft E in turn is intergeared with the upright shaft D by means of bevel gears as at $E^2$, the members of each pair of these gears being preferably as three to one on the driving and driven shafts, whereby shaft D has a somewhat rapid movement as compared with the slower movements of the shafts B and C. The bevel pinion on shaft D at $E^2$ is provided with a spline that operates in a groove of shaft D, these members having an easy fit so that the shaft D while it revolves with the pinion may also slide endwise through the bore of the pinion. The lower end of shaft D is provided with a disk $d$, this disk being the upper member of a clamp for holding and rotating a can while the ends or heads of the can are being soldered to the cylindrical portion or body of the can, such ends having previously been "crimped on." The lower member of the clamp comprises disk F mounted on the upper end of spindle $f$, this spindle being adapted to rotate and move endwise in its journal box $a$.

G is a plunger that is adapted to slide endwise through its supporting box $a'$. The top end of this plunger had better be concaved so as to hold a supply of lubricant. Once in a revolution of shaft B cam $b$ engages and elevates the plunger and holds the latter elevated during the soldering of the can. O is a can supposed to have been placed by hand upon disk F while the clamp was open. The upward movement of plunger G as aforesaid elevates spindle $f$ and the can O, causing the latter to engage disk $d$ and thereby to elevate more or less this disk and the attached shaft D, after which the gravity of shaft D and attachments is supposed to hold the can sufficiently firm in the clamp, and the rotative movement of shaft D is consequently transmitted to the can and to disk F and spindle $f$. If it were found that the gravity of shaft D and disk $d$ were not sufficient for the purpose, a weight might be added as at D', Fig. 1, or a spring if preferred as at $D^2$, Fig. 13, either of which the weight or the spring would co-operate with the gravity of shaft D in clamping the can. Members F, $f$ and G, reverse by gravity, whereupon the can, that, meantime has been soldered, is removed by hand and another can is placed by hand in position in the clamp.

I will next describe the mechanism for applying flux to the can.

Referring more especially to Fig. 10, H is a container for holding the flux the latter being usually muriatic acid. This container has a supporting member H' adapted to rest on and astride of box $a^2$ of the frame where it is secured. This container has two eduction tubes $H^2$ $H^2$, each tube having a valve $H^3$ for regulating the discharge of the flux, the drip from tubes $H^2$ being received into tubes $h$. The latter are supposed to be packed with wicking or other suitable absorbent as at $h'$, and tubes $h$ at the lower ends thereof have lateral openings or nozzles as at $h^2$, through which openings the wicking is supposed to protrude so as to engage disks I I when the latter are thrust forward for engaging the can, whereby disks I I apply the flux, thus received, to the can, just before the soldering is done.

In Fig. 13, tubes $H^2$ and $h$ are omitted except so far as their position is shown in dotted line, so as not to hide other members of the machine. I will here remark that the neatness with which the soldering is done, depends much in applying the flux only to parts to be soldered, and when the flux is applied with a swab or other similar device, the flux is likely to be distributed in places where it is not required, in which case the solder will follow the flux, and the result will be a botch job. By first applying the flux to the disks, it is evident that the disk will apply the flux to the can, only along the tread where the disks engage the can, and hence the solder is confined to a narrow line, just where it is needed, whereby is effected a saving of flux and of solder and a neat job of soldering is the result. Tubes $h$ are held in place by hangers $h^4$, these hangers, as shown, being attached to supporting frame. These tubes extend loosely through sockets $h^3$ of the hangers, such sockets being provided with set screws to hold the tubes in adjustment. The tubes, therefore, by loosening the set screws can be adjusted to feed the flux to disks I I when the latter shall have been adjusted to the can. Disks I I aforesaid are pivotally mounted on the respective holders I', I', each disk being embraced by the ears $I^2$ of its holder, these ears being pierced so that the axial pintle of a disk extends through the embracing ears of the holder. These holders are mounted loosely on the upright rod $I^3$, the holders having set screws for engaging the rod to secure the holders in the desired vertical adjustment on the rod. Rod $I^3$ is an attachment of the horizontal bar $I^4$, this bar being adapted to reciprocate endwise through its supporting boxes $i$, $i'$. The rear end section of bar $I^4$ is screw-threaded and on this section is mounted a toe $I^5$, this toe extending horizontally at right angles to bar $I^4$ in position to engage cam $c$ of shaft C. Bar $I^4$ extends through an eye in toe $I^5$ with nuts respectively on either side of the toe for adjusting the toe lengthwise the bar to accommodate cans of different diameter. Once in a revolution of shaft C, cam $c$ engages toe $I^5$ by which engagement disks I are thrust forward so as to engage the can, such engagement continuing during one or more revolutions of the can, and as the cam retires from its engagement with toe $I^5$ bar $I^4$ and attachments are reversed by the action of spring $i^2$.

J is a stationary block secured to arm A', this block having ways in which the sliding block J' reciprocates. To the latter is attached an upright bar $J^2$ and on this bar are mounted and adjustably secured thereto by means of set-screws plates $J^3$ $J^3$, and on these plates are respectively clamped the soldering tools $j$. Plates $J^3$, one of which is shown more clearly in Fig. 7, are somewhat long so as to accommodate, if desired, two or more soldering tools. It is found that the soldering machine may be run at such high speed that one soldering tool will not properly do the work. In such case one or more extra tools may be added, whereupon the first tool applies the solder and the additional tool or tools smooth off and finish the work. Each soldering tool $j$ (see Fig. 8) is chambered, as shown in dotted lines, and each tool has attached a flexible tool $j'$ for supplying gas to such chamber, where the gas is burned to heat the tool, holes $j^2$ being provided for supplying air to the chamber to support the combustion.

For moving the soldering tools to and from the can, I provide as follows: K is a rod the forward end of which extends into bore $J^4$ of block $J'$, where it abuts a spring $J^5$ for giving a yielding pressure to the soldering tools when the tools engage the can. The other end of rod K is screw-threaded and extends loosely into a bore of block L. The rearward portion $L'$ of this block, is adapted to reciprocate in a mortise in member A. Block L is provided with a transverse chamber in which chamber operates the nut $l$, this nut engaging the screw-threaded section of rod K. The periphery of this nut is toothed, as at $l'$ to constitute a worm gear, and these teeth are engaged by the screw threads, not shown, on shaft $l^2$. The latter is provided with hand wheel $l^3$ and by manipulating this hand wheel, nut $l$ may be rotated in the one direction or the other, to thrust rod K outward, or to draw the rod inward as may be required in adjusting the soldering tools to cans of different diameters. The extreme of member $L'$ is provided with an anti-friction roller $L^2$ for engagment with cam $c'$, the latter being mounted on shaft C. Once in a revolution of shaft C cam $c$ causes the forward movement of blocks L and J by means of which advance the soldering tools are caused to engage the can. Blocks J L and attachments are reversed by the action of spring $J^6$. The soldering wires $m$ $m$ are respectively wound on spools M M shown more clearly in detail in Fig. 3. The trunnions of these spools are journaled in boxes $M'$ of hangers $M^2$, the latter as shown being attached to the supporting frame. Small arms $m'$ are attached to the hangers, these arms at their free ends having eyes or holes through which the wires pass for guiding the wires into grooves $N'$ of the feed rollers N N. The trunnions of these feed rollers are journaled in suitable boxes $M^3$ $M^3$, these boxes being attached to hangers $M^2$. These feed rollers are intergeared as at $N^2$ and one of the rollers N has an axial shaft $N^3$ that extends past member A, where it is supported by a journal box, for instance by box $n'$ of bracket $n$, this bracket being attached to column A. On the outer end of shaft $N^3$ is mounted gear $n^2$ that meshes with gear $n^3$ the latter being affixed to the short upright shaft $n^4$, this shaft being supported by bracket $n$ aforesaid. On shaft $n^4$ is mounted gear $n^5$ and the latter is engaged by mutilated gear $c^2$ of shaft C, the arrangement being such that once in a revolution of shaft C the feed rolls are rotated to feed the soldering wires to the soldering tools. Hangers $M^2$ terminate in sleeves $M^4$ usually of the split variety and these sleeves support the guiding tubes $m^2$, through which tubes the soldering wires pass and are thereby guided as required to contact with the soldering tools, when these tools are advanced to do their work. Tubes $m^2$ are curved more or less as may be required for the purpose and each sleeve $M^4$ is provided with a bolt or screw as at $M^5$ for clamping the embraced tube. After the soldering tools have been adjusted as aforesaid according to the size of the can tubes $m^2$ are adjusted so that their lower ends come in close proximity to the respective soldering tools when these tools are in position advanced for doing their work.

I may here remark that the mechanism for transmitting motion from shaft C to the feed rolls may be varied indefinitely according to circumstances or to the judgment of the builder, so long as the feed rolls are given the necessary intermittent movement adapted to feed the soldering wires to the soldering tools as required.

The soldering machine as shown in Fig. 13 and thus far described is a complete machine and may be operated independent of any other machine and in planning the same I have sought as far as might be to use the same patterns used in making the crimping machine patent as aforesaid, and this will account in a measure for the similarity of the two machines. But as aforesaid it is desirable to operate the soldering machine as an adjunct of the crimping machine and to illustrate the machine when used in such relation, portions of the crimping machine are shown in Figs. 1, 2, 9, and in their proper relations to the soldering machine. The portions of the crimping machine shown bear the reference numerals used in the aforesaid patent, whereas the members of my present machine are designated by letters so that the two are readily distinguished. The soldering machine when used as an adjunct of the crimping machine must be positively timed to the movements of the latter and hence the two machines are intergeared in any suitable manner and in such case the driving pulley $B'$ shown in Fig. 13 is dispensed with. Any suitable and positive transmitting mechanism for connecting the two machines would answer the purpose. In Fig. 1 the crimping disks 54 and 55 are shown in dotted lines to indicate the relative positions of the crimping and soldering stations when these are combined. Also in Fig. 9 such relative position is shown. I will remark that in Fig. 9 are shown three disks "7"

between the crimping and soldering machines and such relative position of the machines gives sufficient working space between them. Otherwise the two machines might be located nearer together or farther apart, but the two machines must be in such relative positions, that while one disk "7" is at the crimping station, another disk "7" must be at the soldering station. I think it will readily be understood that with the machine combined, spindles 6 and disks 7 of the crimping machine successively take the place and do the work of spindle $f$ and disk F of the independent soldering machine, in which case spindle $f$ and disk F are not wanted and consequently are omitted in the combined machine. Also in the combined machine container H and its attachments constructed substantially as shown in Fig. 10 may be mounted for instance on box 33' of the crimping machine with the tubes arranged to apply the flux to the crimping disks 54 and 55 so that these disks will apply the flux to the can while these disks are performing their primary functions of crimping such can. Therefore in the combined machine, the small disks I I and the mechanism for operating the same are dispensed with.

To recapitulate: In case of the combined machine the cans having been placed by hand on the successive disks 7, by means of the intermittent rotative movement of the table of the crimping machine, patent as aforesaid, the cans are successively carried to the crimping station where in addition to being crimped the flux is applied. The cans still resting on disk 7 are from thence carried to the soldering station, and after the soldering, the cans still resting on disks 7 are borne away from the soldering station, the finished cans being eventually removed successively from disks 7, either by hand or by any means that might be employed for discharging the cans from the crimping machine, if this machine were used alone.

By using the two machines combined is effected a great saving in manual labor, for it is evident that the machines when combined require no more attendance, than each separate machine would require. Besides the combined machine requires much less floor space for operating the same, than would be required to successfully operate the machines separately.

What I claim is—

1. In a soldering machine, the combination, of a clamp for holding and rotating the can, disks in position to be rotated by engagement with the can, flux container having eduction members for feeding the flux to the disks, as a means of applying the flux to the can, substantially as and for the purpose set forth.

2. In a soldering machine, the combination, of a clamp for holding and rotating the can, disks for applying the flux to the can, such disks being mounted on holders, such holders having adjustment lengthwise the can, a reciprocating bar bearing such holders, the reciprocations of bar being endwise toward or from the can, substantially as and for the purpose set forth.

3. In a soldering machine, the combination, of a revolving clamp for holding the work, rotative disks for applying flux to the work, such disks being mounted on holders, a reciprocating bar bearing such holders, a cam and a spring arranged to actuate such bar endwise respectively in reverse directions toward and from the work, substantially as and for the purpose set forth.

4. In a soldering machine, the combination, of a revolving clamp, a sliding bar bearing disks, such bar having end play toward and from the work, a cam for actuating the bar, the latter having a toe in position opposing the cam, such toe being adjustable lengthwise the bar, a spring for reversing the bar, substantially as and for the purpose set forth.

5. In a soldering machine, the combination, of a sliding bar and means substantially as indicated for reciprocating the bar toward and from the work, such bar having a (T) tee head, combined with holders adjustably mounted on such head, such holders bearing rotative disks in position for engaging the work with the advance of the sliding bar, substantially as and for the purpose set forth.

6. In a soldering machine, the combination, of revolving clamp for the work, rotative disks having movement to and from the work, a flux container having eduction valves, distributing tubes for receiving the flux, such tubes being packed with wicking, such tubes each having a lateral opening through which the wicking protrudes in position to engage the disks when the latter are advanced to the work, substantially as and for the purpose set forth.

7. In combination, soldering tools, spools, grooved feed-rolls for the soldering wires, hangers provided with suitable journal boxes for said spools and rolls, guiding tubes for the soldering wires located between the feed rolls and the soldering tools, sleeves for supporting such guiding tubes, such sleeves being attached to the respective hangers, substantially as described and for the purpose set forth.

8. In combination, spools, feed rolls and guiding tubes for the soldering wires and hangers for supporting these members, the hangers being provided with split sleeves for embracing and holding the guiding tubes, such split sleeves having clamping bolts for holding the guiding tubes in adjustment, substantially as and for the purpose set forth.

9. The combination of the rotary feed table of a crimping device with a soldering machine constructed substantially as described and located to serve as an adjunct of the crimping device, a container for flux, such container having eduction members arranged to feed the flux to the crimping disks of the crimping device, substantially as and for the purpose set forth.

10. The combination of the rotary feed table of a crimping device with a soldering machine of the variety herein described, the soldering machine being timed to the movement of the crimping device, the soldering machine having a revolving clamp in position for engaging the work while the latter is in position on the crimping device.

In testimony whereof I sign this specification, in the presence of two witnesses, this 14th day of October, 1892.

JOHN W. ROBERTS.

Witnesses:
BELLE S. LOWRIE,
G. P. NASH.